United States Patent
Andersson et al.

(10) Patent No.: US 9,069,462 B2
(45) Date of Patent: Jun. 30, 2015

(54) RECOGNIZING HANDWRITING INPUT USING ROTATABLE SUPPORT LINES

(71) Applicant: Nuance Communications, Inc., Burlington, MA (US)

(72) Inventors: Jonas Andersson, Malmo (SE); Lars Jonas Morwing, Malmo (SE)

(73) Assignee: Nuance Communications, Inc., Burlington, MA (US)

( * ) Notice: Subject to any disclaimer, the term of this patent is extended or adjusted under 35 U.S.C. 154(b) by 145 days.

(21) Appl. No.: 13/830,534

(22) Filed: Mar. 14, 2013

(65) Prior Publication Data

US 2014/0267072 A1    Sep. 18, 2014

(51) Int. Cl.
*G06K 9/00* (2006.01)
*G06F 3/0488* (2013.01)
*G06K 9/62* (2006.01)

(52) U.S. Cl.
CPC .............. *G06F 3/04883* (2013.01); *G06K 9/62* (2013.01)

(58) Field of Classification Search
CPC ..... G06K 9/00; G06K 9/00416; G06K 9/222; G06K 9/32; G06K 9/224; G06F 17/211
USPC ......... 382/181, 182, 187, 188, 190, 200, 201, 382/202, 203
See application file for complete search history.

(56) References Cited

U.S. PATENT DOCUMENTS

| | | | |
|---|---|---|---|
| 5,425,109 A * | 6/1995 | Saga et al. | 382/187 |
| 5,774,582 A * | 6/1998 | Gat et al. | 382/186 |
| 2009/0213085 A1 * | 8/2009 | Zhen et al. | 345/173 |
| 2010/0163316 A1 | 7/2010 | Chang et al. | |
| 2010/0225602 A1 * | 9/2010 | Fujimura | 345/173 |
| 2010/0245230 A1 | 9/2010 | Yaun | |
| 2011/0157028 A1 | 6/2011 | Stallings et al. | |
| 2012/0274987 A1 | 11/2012 | Lapstun et al. | |

FOREIGN PATENT DOCUMENTS

EP    0686291 B1    12/1995

OTHER PUBLICATIONS

International Search Report and Written Opinion for International Application No. PCT/US2014/029089, mailing date Jul. 9, 2014, 15 pages.

* cited by examiner

*Primary Examiner* — Ali Bayat
(74) *Attorney, Agent, or Firm* — Perkins Coie LLP

(57) ABSTRACT

Software, firmware, and systems are described for identifying characters in a handwritten input received from a user on an input device, irrespective of an angle that the input is received at. In one implementation, the system establishes an anchor point and distances from the anchor point to reference support lines. A set of candidate characters is identified based on received handwritten input. The system estimates support lines for each of the candidate characters. The system ranks the candidate characters based on a total deviation measurement from the expectation for each candidate, where the expectation in part is based on the established distance from the established anchor point to reference support lines, and identifies a best-ranked candidate based at least in part on a smallest total deviation measurement.

20 Claims, 8 Drawing Sheets ized handwriting input
RECOGNIZING HANDWRITING INPUT USING ROTATABLE SUPPORT LINES

BACKGROUND

Many devices with a touch interface are able to recognize handwritten input. These devices identify characters in a user's input. They may use the recognized input in many ways, such as for input in a word processing application or as a trigger for executing an application.

A system enabling handwriting recognition utilizes various strategies to identify letters and symbols in a user's input. Some applications require that the system differentiate between uppercase and lowercase characters. One method for differentiating between a character's case is to constrain a user's input by position and size. For example, a software application operating on a tablet computer may display two fixed horizontal lines in an area in which a user is constrained for providing handwritten input, similar to lines on a sheet of notebook paper. When, for example, the software identifies a handwritten entry of the letter 's' in the input area, which only spans half the distance between the horizontal lines, the software may identify a lowercase 's'. But when the input of the 's' spans the entire distance between the horizontal lines, the software may identify an uppercase 'S'.

A prerequisite for a system that differentiates between a character's case in this way is that a user's handwritten input be received at a particular orientation relative to the input area. But in some applications, it is impractical to constrain the orientation of a user's writing. One example is when a device capable of receiving handwritten input is deployed in a vehicle in a center console between a driver's seat and a passenger's seat. It would be useful if both a driver and a passenger of the vehicle could enter handwritten characters from their respective locations. But if the orientation that handwritten input can be received is constrained, either the driver or the passenger may be restricted from writing on the device.

The need exists for systems and methods that overcome the above problems, as well as systems and methods that provide additional benefits. Overall, the examples herein of some prior or related systems and methods and their associated limitations are intended to be illustrative and not exclusive. Other limitations of existing or prior systems and methods will become apparent to those of skill in the art upon reading the following Detailed Description.

BRIEF DESCRIPTION OF THE DRAWINGS

FIG. 1 is a block diagram illustrating a touch-sensitive device for implementing a system for recognizing handwritten input irrespective of orientation that the input is received at.

FIG. 2 is a block diagram of a system for recognizing handwritten input irrespective of orientation that the input is received at.

DETAILED DESCRIPTION

Figure 1:
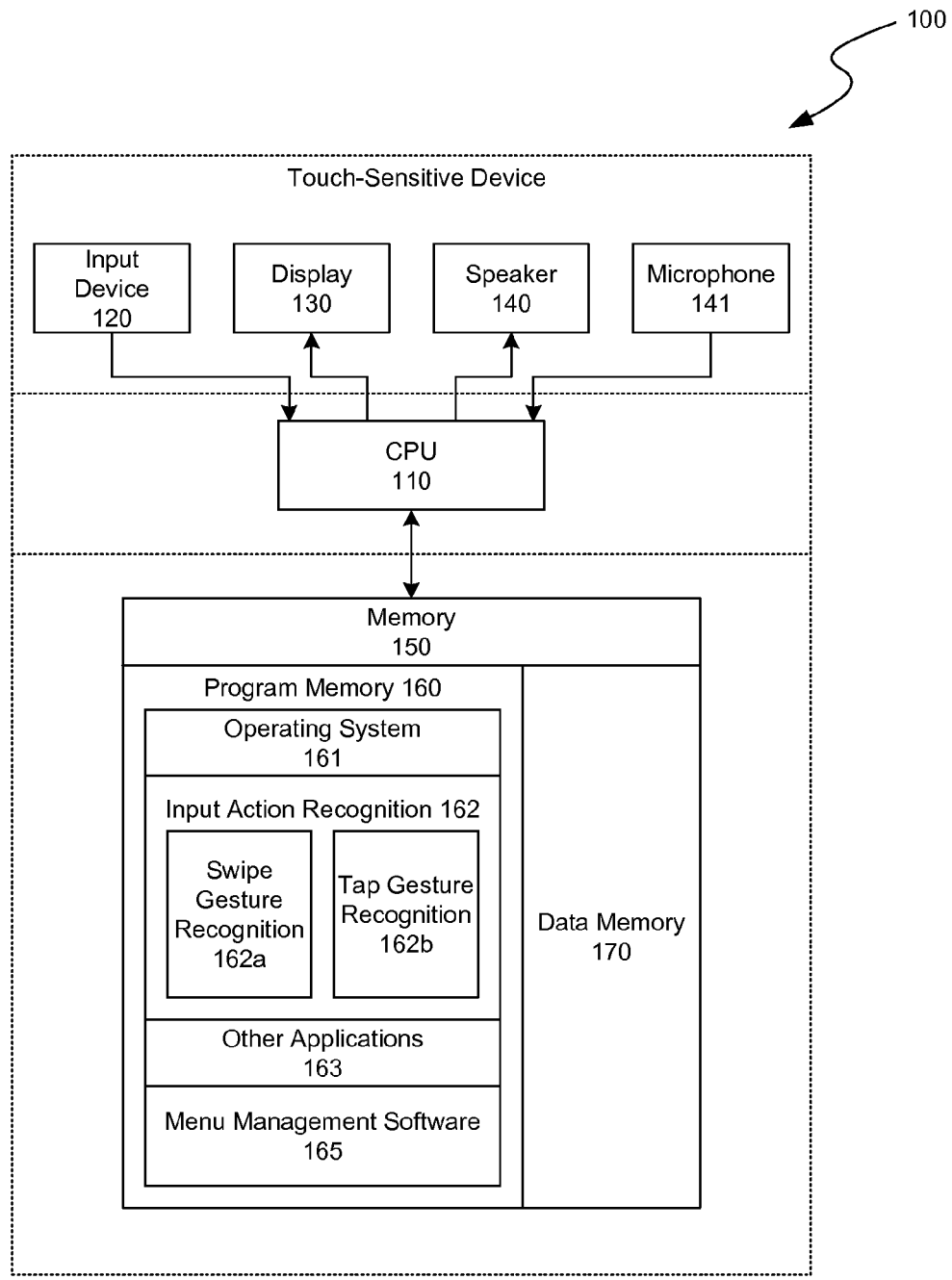

The headings provided herein are for convenience only and do not necessarily affect the scope or meaning of the disclosure.

Overview

Software, firmware, and systems are described herein that permit a user to handwrite a character on a touch-sensitive device and have the character be accurately recognized irrespective of the orientation at which the character was written. A system according to the present disclosure enables a circular touch-sensitive device to be deployed, for example, in a center console of a vehicle, and receive and recognize handwritten entry for navigation to a point of interest from either a driver or a passenger of the vehicle by providing the same recognition accuracy at different writing angles on the touch-sensitive device.

The system identifies support lines on a writing area of a touch-sensitive device. The support lines include a "baseline," indicating a vertical position at which a character should be entered by a user, and a "helpline," indicating a height that a submitted character should have. The system identifies an "anchor point," around which the support lines can rotate. Consequently, there is not one set of support lines, as there would be in a fixed-orientation system. Instead, around an anchor point there may be considered a multitude or infinite number of support lines that are at the same perpendicular distance from the anchor point. The system compares a user's handwritten input to the anchored support lines to correctly recognize the handwritten input. In some implementations, the support lines are limited to an angle range or other constraint, such as a set of fixed angles. By limiting the support lines, the reference support lines will not adapt to an angle outside the limit and any deviation from the expected support lines that stretch outside a limited range will be adjusted or "punished" to a greater degree.

In some implementations, the system recognizes a character in handwritten user input based at least in part on deviations between support lines of candidate characters and reference support lines. The system establishes an anchor point and distances from the anchor point to reference support lines. A set of candidate characters is identified based on received handwritten input. The system estimates a writing angle for each candidate character and establishes candidate support lines for each candidate character. The system identifies deviations between the candidate support lines and the reference support lines. And the system ranks the candidate characters and chooses the best candidate character that corresponds to the handwritten user input based at least in part on the deviations between the candidate support lines and the reference support lines for each candidate character.

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention may include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

Illustrative Environment

FIG. 1 is a simplified system block diagram of hardware components of a touch-sensitive device 100 for implementing a handwriting recognition system. The device 100 includes one or more input devices 120 that provide input to the CPU (processor) 110, notifying it of actions performed by a user, such as a received touch and gesture from the user. The actions are typically mediated by a hardware controller that interprets the signals received from the input device and communicates the information to the CPU 110 using a known communication protocol. Input devices 120 include, for example, a capacitive touchscreen, a resistive touchscreen, a surface wave touchscreen, a surface capacitance touchscreen, a projected capacitive touch screen, a mutual capacitance touchscreen, a self-capacitance sensor, an infrared touchscreen, an infrared acrylic projection touchscreen, an optical imaging touchscreen, a touchpad that uses capacitive sensing or conductance sensing, or the like. Other input devices that may employ the present system include wearable input devices with accelerometers (e.g. wearable glove-type input devices), a camera- or imager-based input device to receive images of manual user input gestures, and so forth.

The CPU may be a single processing unit or multiple processing units in a device or distributed across multiple devices. Similarly, the CPU 110 communicates with a hardware controller for a display 130 on which text and graphics, such as support lines and an anchor point, are displayed. One example of a display 130 is a display of the touchscreen that provides graphical and textual visual feedback to a user. In some implementations, the display includes the input device as part of the display, such as when the input device is a touchscreen. In some implementations, the display is separate from the input device. For example, a touchpad (or trackpad) may be used as the input device 120, and a separate or standalone display device that is distinct from the input device 120 may be used as the display 130. Examples of standalone display devices are: an LCD display screen, an LED display screen, a projected display (such as a heads-up display device), and so on. Optionally, a speaker 140 is also coupled to the processor so that any appropriate auditory signals can be passed on to the user. For example, a touch-sensitive device may generate audio corresponding to a word recognized by the touch-sensitive device. In some implementations, the touch-sensitive device includes a microphone 141 that is also coupled to the processor so that any spoken input can be received from the user.

The processor 110 has access to a memory 150, which may include a combination of temporary and/or permanent storage, and both read-only and writable memory (random access memory or RAM), read-only memory (ROM), writable non-volatile memory, such as flash memory, hard drives, floppy disks, and so forth. The memory 150 includes program memory 160 that contains all programs and software, such as an operating system 161, an input action recognition software 162, and any other application programs 163. The input action recognition software 162 includes input gesture recognition components, such as a swipe gesture recognition portion 162a and a tap gesture recognition portion 162b. The input action recognition software may include data related to one or more enabled character sets, including character templates (for one or more languages), and software for matching received input with character templates and for performing other functions as described herein. The program memory 160 may also contain menu management software 165 for graphically displaying two or more choices to a user and determining a selection by a user of one of said graphically displayed choices according to the disclosed method. The memory 150 also includes data memory 170 that includes any configuration data, settings, user options and preferences that may be needed by the program memory 160, or any element of the device 100. In some implementations, the memory also include dynamic template databases to which user/application runtime can add customized templates. The run-time created dynamic databases can be stored in persistent storage for loading at a later time.

In some implementations, the touch-sensitive device also includes a communication device capable of communicating wirelessly with a base station or access point using a wireless mobile telephone standard, such as the Global System for Mobile Communications (GSM), Long Term Evolution (LTE), IEEE 802.11, or another wireless standard. The communication device may also communicate with another device or a server through a network using, for example, TCP/IP protocols. For example, the touch-sensitive device may utilize the communication device to offload some processing operations to a more robust system or computer.

Illustrative System

Figure 2:
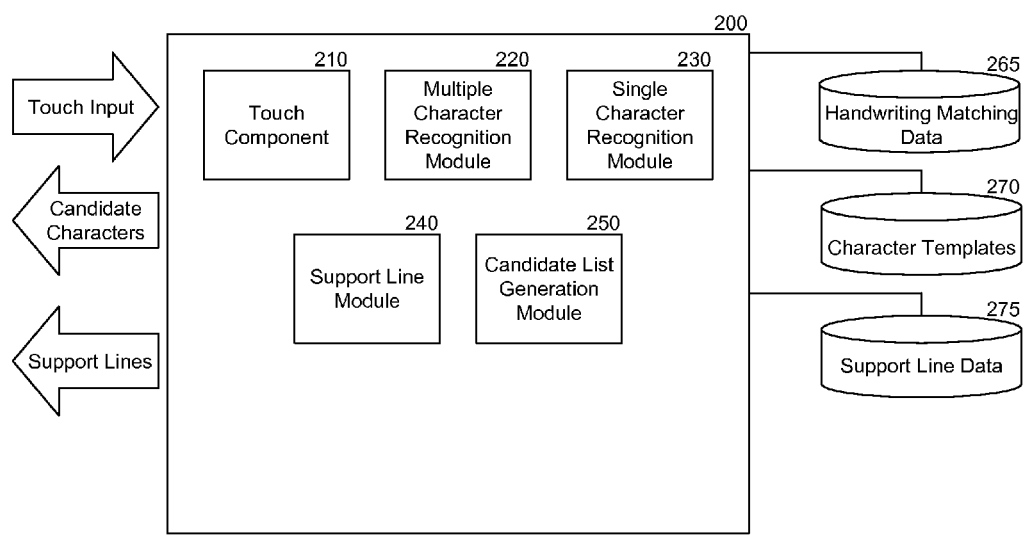

FIG. 2 is a block diagram illustrating a handwriting recognition system 200 for recognizing handwritten input irrespective of an orientation that the handwriting input is received at. The system may be implemented on the touch-sensitive device 100. The system receives touch input from a user and outputs candidate characters and, optionally, support line data. Candidate characters may include a character string of a candidate and, in some implementations, a recognition distance and other information regarding each candidate. The system includes a touch analysis component 210, a multiple character recognition module 220, a single character recognition module 230, a support line module 240, and a candidate list generation module 250. The system reads data from and stores data in handwriting matching data storage area 265, character templates data storage area 270, and support line data storage area 275. In some implementations, the system does not include a multiple character recognition module.

Touch input includes data sensed by a touch-sensitive input device when a user touches the device. (While a touch-sensitive input device is generally described herein for convenience, other input devices may be employed, such as the wearable input devices and camera- or imager-based input devices noted above.) Touch input includes strokes, curves, and points. A curve may include one or more strokes, a stroke may include one or more points, and a point specifies one x-y coordinate. Touch input may be raw data or it may be processed touch data. Touch data includes a received handwritten character or string of characters from a user and a user's selection of a menu option, or the like. In some implementations the system 200 supports multi-touch input. For example, the system may accept two or more strokes drawn simultaneously using two or more fingers.

The system outputs candidate characters, which may be displayed to a user for the user to select the candidate character that corresponds to the user's intended input. Each candidate character has associated with a string. A top-ranked candidate character represents the system's best guess of what character a given stroke or sequence of strokes represents. Finally, the system may output support lines, including position, scale, and angle information relative to the anchor point, and this support line information may be displayed to a user to help guide the user's input, and explained below.

The touch component 210 receives touch input data and sends it to the multiple-character recognition module. The multiple character recognition module 220 identifies subsets of strokes from the touch input data and iteratively sends the stroke subsets to the single character recognition module. The multiple character recognition module then receives back from the single-character recognition module a ranked list of candidate characters for each stroke subset. The multiple character recognition module combines the single character recognition candidate lists for each stroke subset into one multiple character recognition candidate list as a Unicode sequence for each stroke subset and support line estimation. In some implementations, if anchored support lines have been set, the multiple character recognition module applies the support lines constraint to the multiple character recognition candidate list and computes deviations between the user input and the estimated support lines so that any temporary references used by the single-character recognition module are based on the new combined support lines. In some implementations, a combined support lines estimate for a string candidate is the average of support lines estimates of all single character candidates combined into the string candidate. For example, if the string, "hello," were submitted by a user by writing each character of the string on top of the previous character, and the candidate estimate for the writing angle for 'h' were 60 degrees, while the candidate estimate for the writing angle for "ello" were for each character 40 degrees, the estimate for the combined support lines would be the average of these results, i.e., 44 degrees. If the string were submitted by writing left-to-right or right-to-left, more holistic views on a support line estimate may be taken. For example, the system may fit a line to the estimated baseline points of the five characters and the combined writing angle estimate may be used for the temporary reference for each of the five characters (i.e., the punishments could be recalculated).

The single character recognition module 230 produces a ranked list of candidate characters for stroke subsets sent by the multiple character recognition module 220. In creating the ranked list, the single character recognition module accesses handwriting matching data in data storage area 265, character templates in data storage area 270, and support line data in data storage area 275 and from the support line module 240. The single character recognition module is configured to match a shape of a stroke subset to curves of a character template and produces a pure shape distance. The single character recognition module generates a total distance measurement by adding the pure shape distance to a calculated punishment and weighs the components of the punishment (i.e., position, scale and angle) by their discriminative and stability properties. The single character recognition module generates the ranked list based on the total distance measurement, ranking those candidate characters higher that have a smaller distance.

The support line module 240 establishes support lines, including a perpendicular distance from an anchor point to the support lines, as described more fully below. The support line module 240 stores and accesses support line data in data storage area 275. In some implementations, the support line module 240 adjusts a reference angle of support lines based on a candidate character chosen for a stroke subset, as specified by the candidate list generation module. The candidate list generation module 250 generates a list of character candidates to display to the user that may match the user's input. The candidate list generation module receives touch input of a user's selection of a candidate character and identifies that candidate character as corresponding to the user's handwritten input.

Illustrative Process

Figure 3:
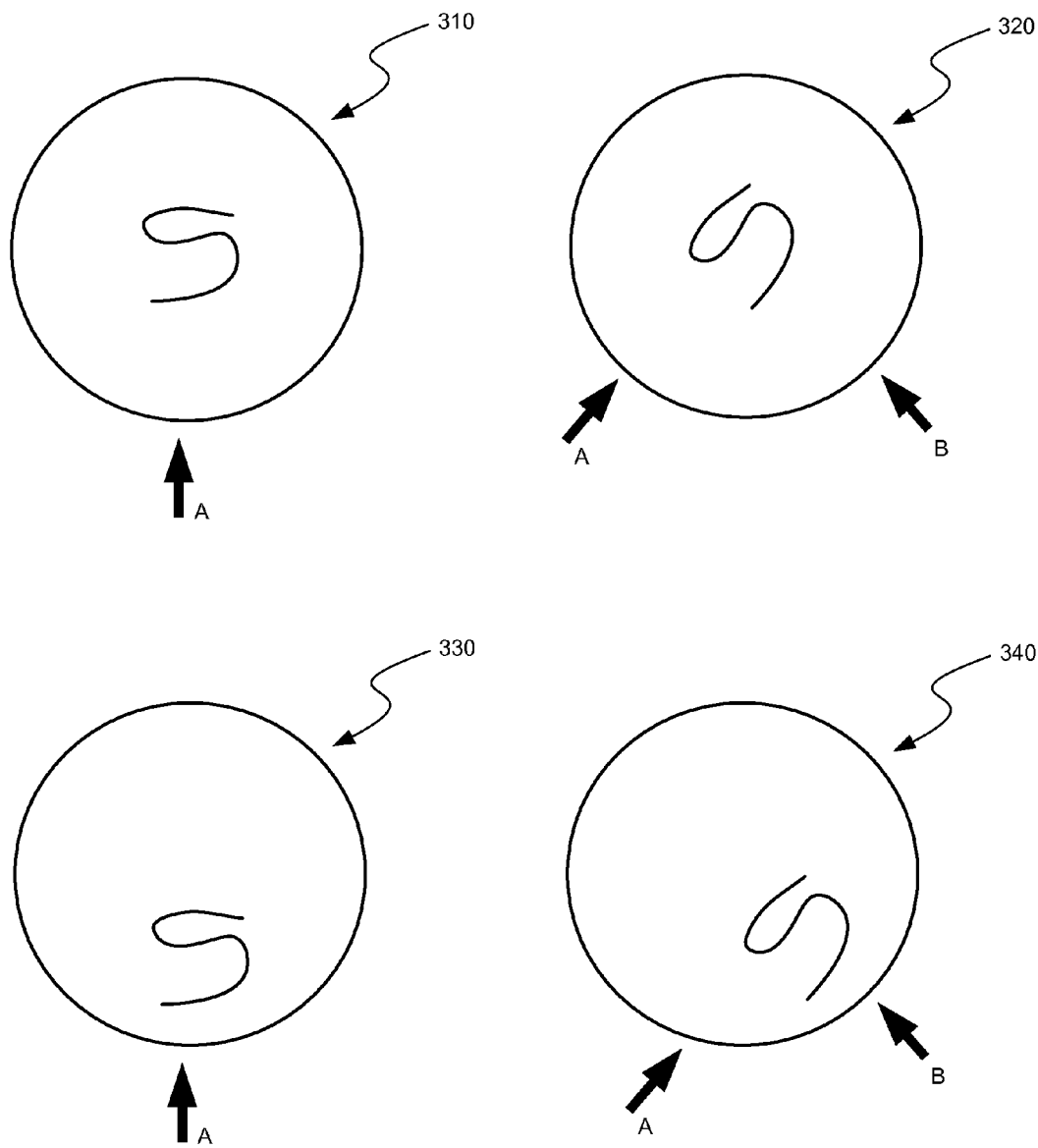
FIG. 3 shows representative displays showing user handwriting input at various orientations to the displays.

The handwriting recognition system 200 is configured to recognize a user's input on a touch-sensitive device regardless of an orientation of the user's input. Typically, it is difficult for a system to differentiate between some handwritten character when an orientation of the user's handwritten input is unknown. For example, FIG. 3 shows displays that include a handwritten letter 's', entered at various orientations and locations on touch-sensitive devices. Because a lowercase 's' and an uppercase 'S' have the same shape, it may be impossible for a system to accurately recognize the user's input without knowing more about the input than the shape. A first display 310 shows the letter 's' entered in the center of the display and at a vertical orientation on the touch-sensitive device. A second display 320 shows the letter 's' entered by a user B at an angle that differs from the angle of the input on the first display 310. A third display 330 shows the letter 's' entered by user A at the vertical orientation, but the 's' is entered at the bottom of the display. A fourth display shows the letter 's' entered by user B at on the side of the display and at an angle that differs from the vertical angle. Based on these inputs, a system would have a difficult time accurately recognizing characters in the input.

Figure 4:
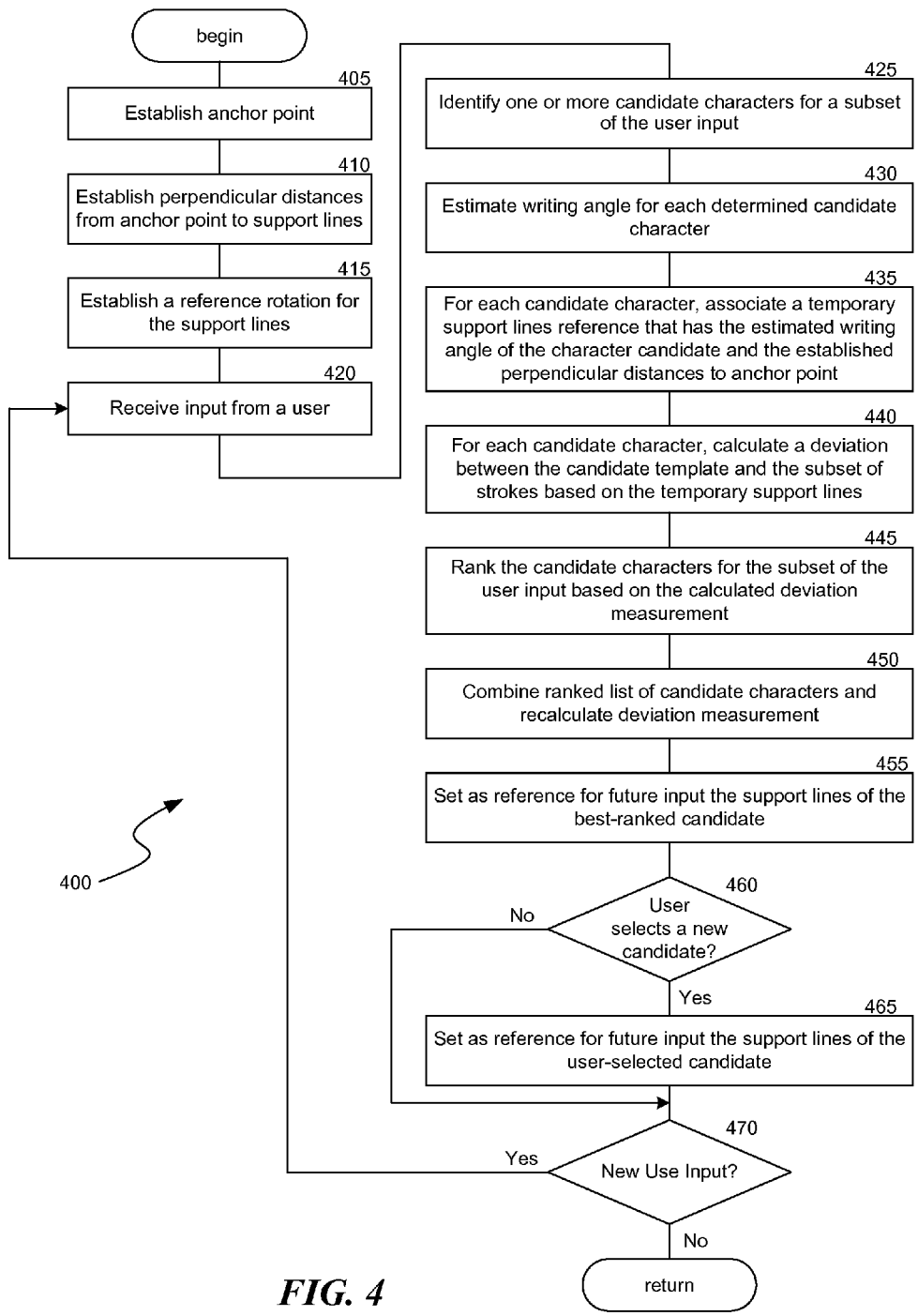
FIG. 4 is a flow diagram illustrating a process implemented by the system for recognizing handwritten input irrespective of orientation that input is received for recognizing handwritten input.
Figure 5A:
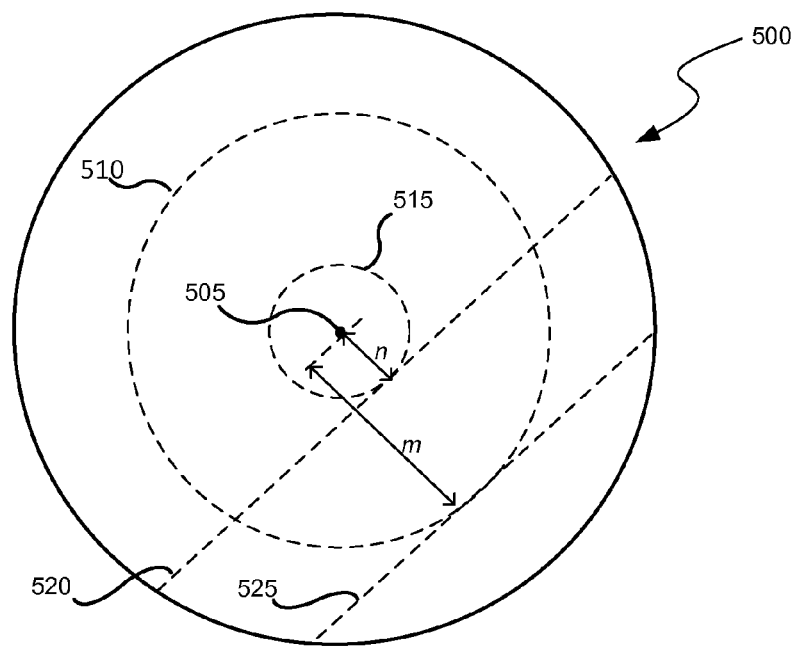
FIGS. 5A-F are representative touch-sensitive devices showing support lines for recognizing a user's handwritten input.

FIG. 4 is a flow diagram illustrating a process 400 implemented by the handwriting recognition system 200 for recognizing handwritten user input entered on a touch-sensitive device regardless of an angle of orientation that the input is entered. At a block 405, the system establishes an anchor point. The anchor point represents a reference location on the touch-sensitive device that is used for determining an angle at which a user's handwritten input is received. FIG. 5A shows a representative touch-sensitive device 500 including an anchor point 505. Although the touch-sensitive device 500 is circular, in some implementations, a touch sensitive device is another shape, such as a rectangle, a trapezoid, a triangle, a cone, or an oval. In FIG. 5A, the anchor point 505 is located in the center of the touch-sensitive device. In some implementations, the anchor point is located at another location on a touch-sensitive device, such as near a top edge of the touch-sensitive device. The touch-sensitive device may display the anchor point to a user or it may be hidden. For example, when a touch-sensitive device is implemented using a trackpad, a manufacturer can permanently mark an anchor point on the trackpad. Similarly, when a touch-sensitive device is implemented using a touch-sensitive display, such as on a tablet computer, software controlling the display may cause the display to show an anchor point.

At a block 410, the handwriting recognition system establishes distances from the anchor point to support lines. Support lines are used as a reference by the system to relate a user's handwritten input to a position, a size, and a rotation, which the system uses for recognizing the input. In some implementations, support lines include a baseline and a helpline. A baseline of the support lines indicates a vertical position at which a character should be entered by a user, and a helpline of the support lines indicates a height for the submitted character with reference to the baseline. For example, in FIG. 5A, a distance m separates a baseline 525 and the anchor point 505, and a distance n separates a helpline 520 and the anchor point 505. The baseline 525 provides a lower boundary for a user's handwritten input in a way that is similar to how a line on notebook paper provides a user guidance for where to write. A distance between the helpline and baseline, equal to m−n, provides an expected height for the user's input. In some implementations, the helpline intersects the anchor point, meaning there is no distance n. The value of n may also be negative, meaning that the helpline is on the opposite side of the anchor point from the baseline. In some implementations, the system uses another reference instead of support lines. For example, the system may use a rectangle or another shape as a reference instead of support lines. Accordingly, when using a different reference from support lines, the handwriting recognition system establishes distances to other points of the reference to enable it to relate the user's input to position, size, and rotation. Thus, while the process 400 is described with reference to support lines, it should be understood that another reference may be used.

Figure 5B:
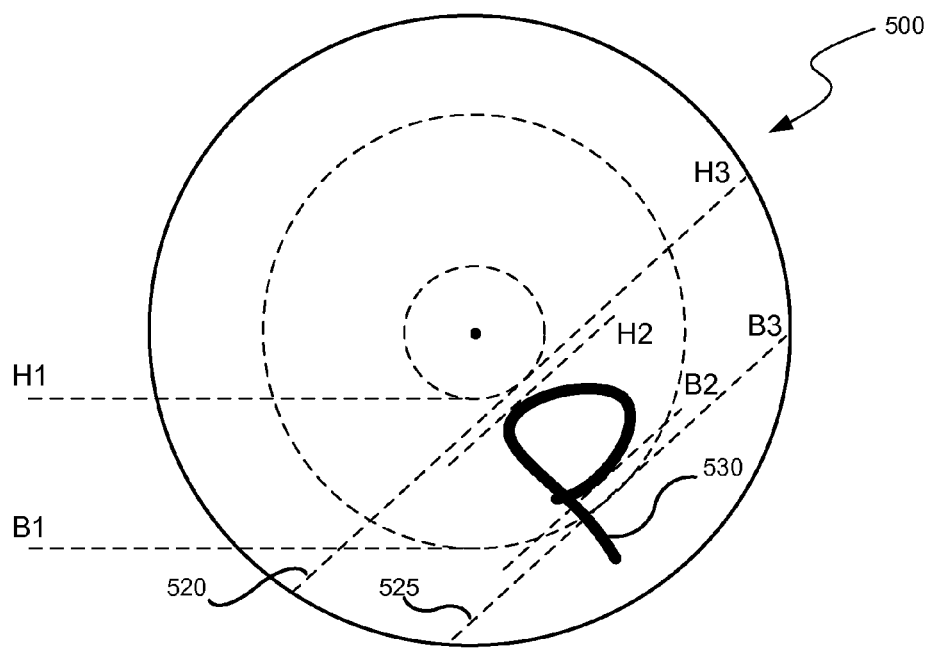
Figure 5C:
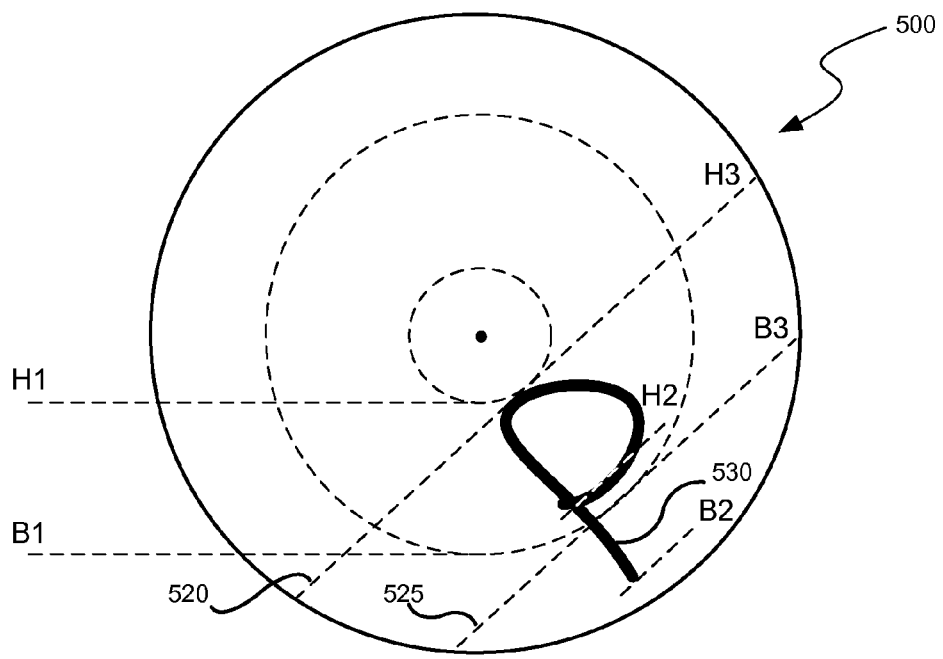
Figure 5D:
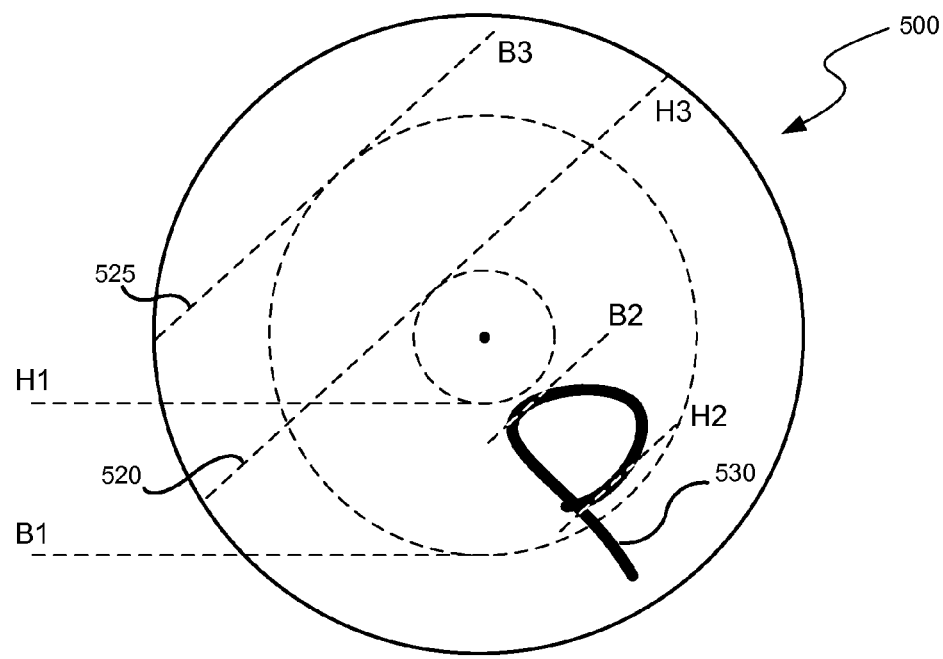
Figure 5E:
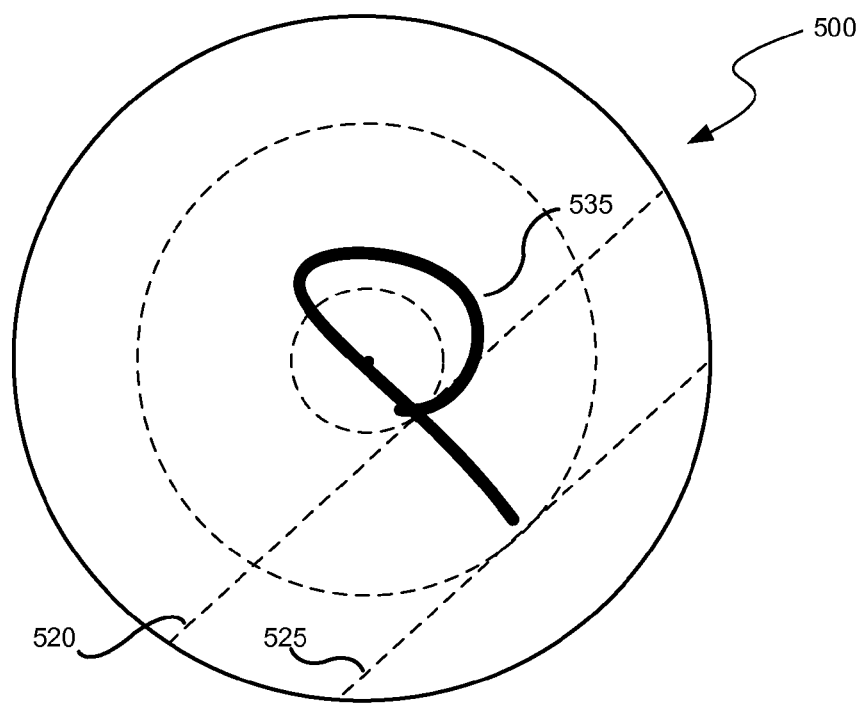

FIGS. 5B, 5C and 5D provide examples of how support lines can provide a size and position reference for the system. FIG. 5B shows the touch-sensitive device 500 including a representative handwritten user input of a character 530, 'p'. The character 530 was entered so that the base of the 'p' is located on the baseline and the bottom of the 'p' is located below the baseline. FIG. 5C shows the touch-sensitive device 500 including a representative handwritten user input of a character 530, 'P', but in the same position as the 'p' of FIG. 5B (thus the base lines differ, as explained below). FIG. 5D shows the touch-sensitive device 500 including a representative handwritten user input of a character 530, 'd' but also in the same position as the 'p' of FIG. 5B. As discussed further below, FIGS. 5B-5D also show various support lines, B1, H1, B2, H2, B3, and H3. FIG. 5E shows the touch-sensitive device 500 including a representative handwritten user input of a character 535, 'P'. The character 535 was entered so that the base of the 'P' is on the helpline and the bottom of the 'P' is on the baseline. The character 530 in Figure B, 'p', is lowercase, whereas the character 530 and 535 in FIGS. 5C and 5E, 'P', are uppercase. The system therefore may distinguish between the lowercase and uppercase characters, 'p' and 'P', and lowercase 'd' based at least in part on their positions relative to the helpline 520 and baseline 525. The character 530 in FIG. 5B, 'p', has a base that is positioned directly above the baseline, whereas the character 535 in FIG. 5E, 'P', has a base that is positioned directly above the helpline, with its bottom extending to the baseline.

Figure 5F:
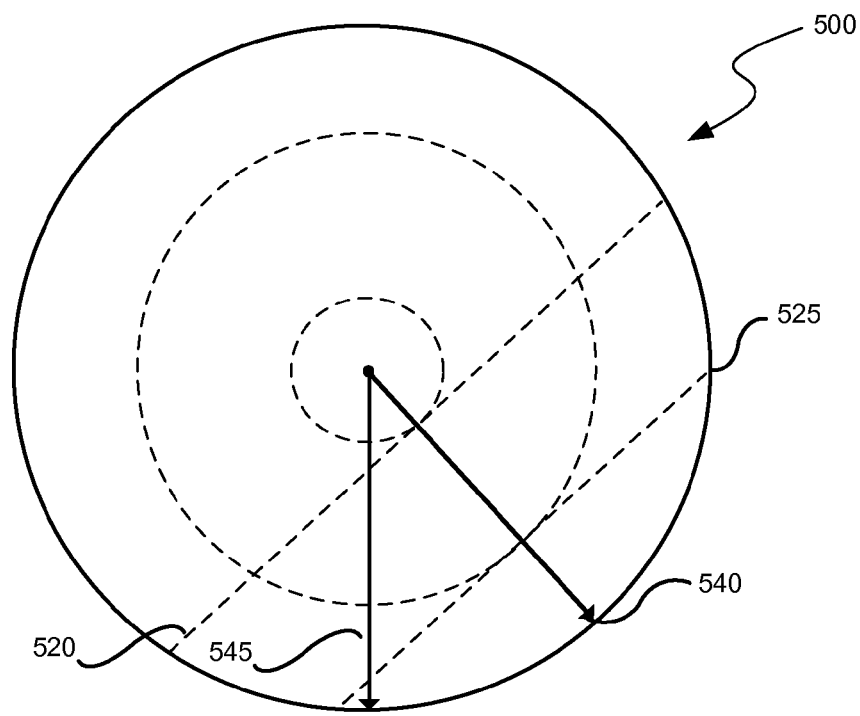

As mentioned above, the support lines also provide a rotation reference used by the system for recognizing a user's handwritten input. Returning to FIG. 4, at a block 415, the system establishes a reference rotation for the support lines. In some implementations, the rotation for the support lines is expressed as an angle between a reference line and a line perpendicular to the support lines at locations on the support lines of the established distances from block 410. For example, FIG. 5F shows the touch-sensitive device with a reference line 545 and a perpendicular line 540. The perpendicular line intersects the baseline 525 and the helpline 520 at the established distances for these lines from the anchor point. The angle between the reference line and perpendicular line provides the rotation for the support lines. In some implementations, the established reference rotation is based at least in part on a rotation of an already-recognized character. Although not depicted in FIG. 4, the system also establishes a character set to recognize.

Figure 6:
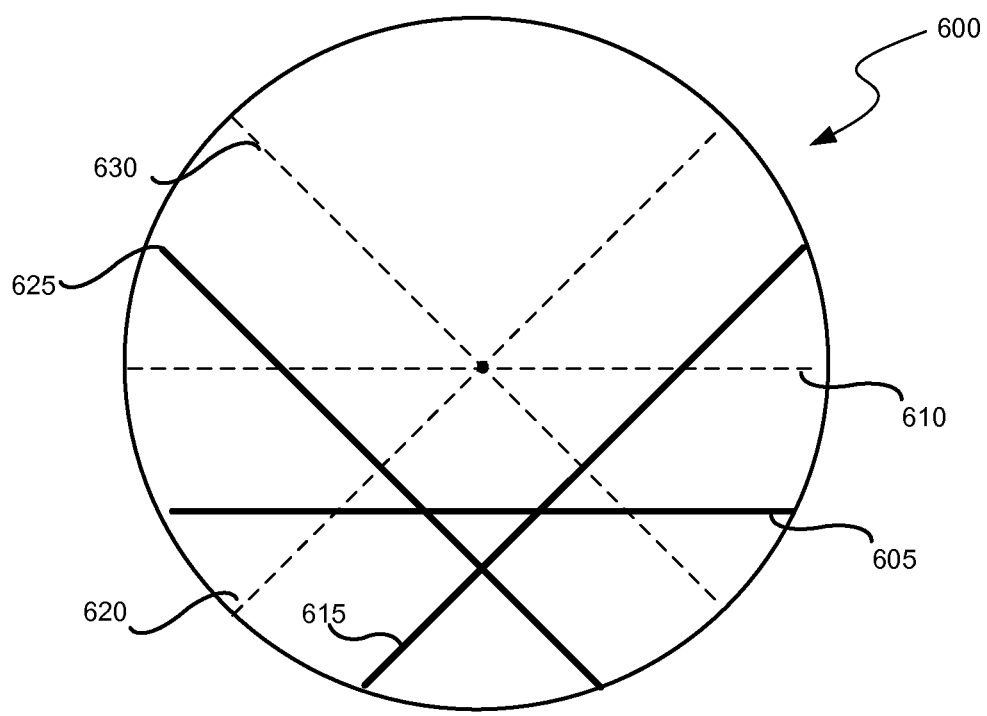
FIG. 6 is a representative touch-sensitive device showing support lines for recognizing a user's handwritten input.

The support lines may rotate around the anchor point to provide for a different orientation of a user's input. The support lines rotate around the anchor point at the established distance from block 410. FIGS. 5A-C show a first concentric circle 510 and a second concentric circle 515. The first concentric circle 510 has a radius of distance m, and the second concentric circle 515 has a radius of distance n. Support lines can rotate around the anchor point, providing a reference for the rotation of the user's input. In some implementations, the system does not display support lines on the touch-sensitive device and instead displays concentric circles representing the established distances between the anchor point and the baseline and helpline. In some implementations, these concentric circles are not displayed; instead they are implied to the user in other ways, such as in general user interface design and end-user documentation. In some implementations, the system displays multiple anchored support lines. For example, FIG. 6 shows a touch sensitive device 600 that includes a first baseline 605 and first helpline 610, a second baseline 615 and second helpline 620, and third baseline 625 and third helpline 630, all rotated around an anchor point 602. The system may display multiple support lines in order to guide user input from specific orientations relative to the touch-sensitive device, determined based at least in part, for example, on an anticipated orientation of the user relative to the touch-sensitive device. For example, if the touch-sensitive device is deployed in the center console of an automobile, the system may display support lines that anticipate input from either the driver or the passenger.

Returning to FIG. 4, at a block 420, the handwriting recognition system receives a handwritten input from the user, which the user enters via the touch-sensitive device. The user may handwrite, for example, by pressing and dragging a stylus or a finger against the touch-sensitive device. In some implementations, the user input comprises a curve, which includes one or more strokes, and the one or more strokes each include one or more points that are represented as an x-y coordinate of a location contacted by the user on the touch-sensitive device. In some implementations, the system supports curves that have multi-touch stroke sequences. In some implementations, the user enters a single character at a time and enters a sequence of characters at a same location on the touch-sensitive device, one on top of the other. For example, a user may submit a word by successively writing letters of the word in one location on a touch-sensitive device. In other implementations, the user can enter a single character or an entire string. In some implementations, the system receives the user input prior to establishing support lines.

After or during the time the user input is received, the system iteratively matches subsets of strokes of the user input to candidate characters, producing a ranked list of candidate characters for each subset of strokes. At a block 425, the system identifies one or more character candidates that are to be part of a ranked list for each subset of strokes. The system compares the shape of each subset of strokes to curves included in character templates associated with characters of an enabled character set (e.g., the ISO basic Latin alphabet). Each character template corresponds to a model of a character and includes the Unicode value of the character it represents, a curve to represent shape properties of the character, and support lines to represent size and position properties of the character. In some implementations, a template includes a string of Unicodes that has a length greater than 1. In some implementations, the Unicode value of a character is associated with multiple templates to reflect variations in how users write that character. In some implementations, the system supports dynamic databases, under which a user can run-time create custom templates. For example, a user may draw a shape or curve that looks like an envelope and associate the curve with a string of Unicodes that is an email address. As another example, a customer may implement a "turn page" gesture by associating a desired shape for this gesture with Unicode 0xE001. When the system returns Unicode 0xE001 to an application for the customer, the application recognizes that the user submitted a gesture to turn a page and performs that action rather than a typical insertion action of recognized characters.

Based on the comparison between the curves of each character template and the subset of strokes, the system produces a "pure shape distance" measurement for each character template and a similarity transformation (i.e., a translation, scaling, and rotation transformation) between the character template to the subset of strokes. In some implementations, the system utilizes a Geometrical Invariant Technology proximity measure to match the shape of each subset of strokes with the curves of each character template, which provides a pure shape distance that is not affected by differences explained by a similarity transformation. The Geometrical Invariant Technology proximity measure also produces a similarity transformation between the subset of strokes and the curves of the character template. Further details regarding character recognition can be found in the assignee's commonly-owned U.S. Pat. No. 6,711,290, issued on Mar. 23, 2004, entitled CHARACTER RECOGNITION, U.S. Pat. No. 7,139,430, issued on Nov. 21, 2006, entitled CHARACTER RECOGNITION, and European Patent No. 1105833, entitled CHARACTER RECOGNITION, which are all incorporated by reference in their entirety.

After determining candidate characters for a given subset of strokes, the system ranks the candidate characters according to the candidate that is most likely the correct result. First, at a block 430, the system estimates the writing angle for each determined candidate character. To estimate the writing angle the system, for each candidate character of a subset of strokes, assumes that the character template for the candidate character is the correct template for the subset and estimates support lines for the subset of strokes based on the similarity transformation determined at block 425 and support lines of the character template for that candidate character. Further details regarding estimated similarity transformations can be found in the assignee's commonly-owned U.S. Pat. No. 7,313,277, issued on Dec. 25, 2007, entitled METHOD AND DEVICE FOR RECOGNITION OF A HANDWRITTEN PATTERN, which is incorporated by reference in its entirety.

At a block 435, for each candidate character of the subset of strokes, the system associates a temporary reference support lines. Referring again to FIG. 5B, the temporary reference support lines for 'p' are lines B3 and H3. The temporary reference support lines, B3 and H3, are used to calculate position and scale aspects of a deviation between estimated support lines, B2 and H2 for 'p', and the temporary reference support lines, instead of the actual reference support lines, B1 and H1. The temporary reference support lines, B3 and H3, are constructed by taking the angle of the candidate's estimated support lines, B2 and H2, and applying the anchor constraint (i.e., distance m and distance n from the anchor point). Similar temporary reference support lines, B3 and H3, are used to calculate position and scale aspects of a deviation between estimated support lines, B2 and H2 for 'P' (FIG. 5C) and 'd' (FIG. 5D), and the temporary reference support lines, instead of the actual reference support lines, B1 and H1.

At a block 440, for each candidate character of the subset of strokes, the system calculates a "total distance measure" between the subset of strokes and the candidate template. The total distance measure is equal to a punishment value divided into three components of position, scale, and angle, weighed by their discriminative and stability properties and added to the pure shape distance for the character candidate determined at block 425. As used herein a "punishment" is a numerical representation of a deviation between reference (i.e., expected) support lines and the estimated support lines of the input as described herein, though any form of adjustment may be used. In determining the punishment for the angle, the system identifies a punishment based on the deviation in angle between the reference support lines established at block 415 and the estimated writing angle for the support lines for that candidate character determined at block 430. In determining the punishment for position and scale, the system identifies a punishment based on deviations in position and scale between the temporary reference support lines associated with the candidate character and the estimated support lines as determined at block 430. There can also be a punishment for the deviation between the angle given by the position of the subset of strokes and the estimated writing angle for that candidate character determined at block 430. In implementations in which a reference rotation for the support lines has not been established, the system may take the angle of the reference support lines to be zero. The total distance measure may thus be broken down into five components, including the following:

Shape deviation punishment (e.g., measured similarity transformation invariantly);

Rotation around curve mass center deviation punishment (e.g., referring to FIG. 5B, a measurement of an angle deviation between lines B2 and B1);

Size deviation punishment (e.g., referring to FIG. 5B, a measurement of deviation between the orthogonal distance between lines B2 and H2 and the orthogonal distance between lines B3 and H3);

Position deviation punishment (e.g., referring to FIG. 5B, a measurement of the orthogonal distance between lines B2 and B3 and how the measurement deviates from 0); and Rotation around anchor point deviation punishment (e.g., referring to FIG. 5B, a measurement of the angle deviation of line B2 from the angle given by the curve's position (e.g., the curve's mass center or, more specifically, the orthogonal projection point of the curve's mass center to the center point of line B2) around the anchor point).

Referring to FIG. 5B, if the candidate character were a 'p', the following is how these five components would fair: 1. Good; 2. Bad. 45 degree deviation; 3. Ok; 4. Good; and 5. Good. If the candidate character were a 'P' (FIG. 5C), the following is how these five components would fair: 1. Good; 2. Bad. 45 degree deviation; 3. Ok; 4. Bad; and 5. Good. If the candidate character were a 'd' (FIG. 5D), the following is how these five components would fair: 1. Good; 2. Very bad. 135 degree deviation; 3. Ok; 4. Very bad; and 5. Very bad. 180 degree deviation.

At a block 445, the system generates a ranked list of candidate characters for each subset of strokes based on the total distance measure calculated for each candidate character at block 440. The lower the total distance calculated for a candidate character the better a match it is for the subset of the stroke. At a block 450, the system optionally combines ranked list or lists of candidate characters for successive subsets of strokes to form a combined candidate list regarding a Unicode sequence and estimated support lines for each candidate character of the combined list as determined at block 430. In some implementations, when the perpendicular distances from anchor point to support lines have been established at block 410, this anchor constraint is applied to the combined estimations and the punishments recalculated so that the temporary reference support lines for each candidate is based on the new combined estimates for support lines. For example, as discussed above with reference to FIG. 2, the system may calculate a combined support lines estimate for a string candidate based on the average of the support lines estimates of all single character candidates that were combined into the string candidate. Or the system can fit a line to estimated baseline points of all characters of a string, and the combined writing angle estimate may be would be used for the temporary reference for each of the characters of the string (i.e., the punishments would need to be recalculated).

At a block 455, the system optionally sets the support lines of the best-ranked candidate from the ranked list as the reference support lines for future input. For example, referring again to FIG. 5B, by default, the system adapts the reference support lines (B1 and H1) to the temporary reference support lines (B3 and H3) of the best-ranked candidate. In some implementations, the system foregoes adapting the reference support lines altogether, or it does so only when it is confident about the candidate character. In some implementations, the system presents to the user the best candidate character for the user to select. At a decision block 460, the user is presented the option to select a candidate character. If the user selects a candidate character, the process proceeds to a block 465 and the support lines of the user-selected candidate character are set as the reference support lines for future input. Adaptation based on a user-selected candidate character or the best-ranked candidate is optional, controllable by run-time settings. The process then proceeds to a decision block 470. If the user does not select a candidate character, the process proceeds to decision block 470 without setting the reference support lines as those of a selected candidate. At decision block 470, it is determined whether new user input has been received. If new user input has been received, the process returns to block 420 having new reference support lines. Otherwise, the process returns.

CONCLUSION

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Modules described herein may be executed by a general-purpose computer, e.g., a server computer, wireless device, or personal computer. Those skilled in the relevant art will appreciate that aspects of the invention can be practiced with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "server," "host," "host system," and the like, are generally used interchangeably herein and refer to any of the above devices and systems, as well as any data processor. Furthermore, aspects of the invention can be embodied in a special purpose computer or data processor that is specifically programmed, configured, or constructed to perform one or more of the computer-executable instructions explained in detail herein.

Software and other modules may be accessible via local memory, a network, a browser, or other application in an ASP context, or via another means suitable for the purposes described herein. Examples of the technology can also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein.

Examples of the technology may be stored or distributed on computer-readable media, including magnetically or optically readable computer disks, hard-wired or preprogrammed chips (e.g., EEPROM semiconductor chips), nanotechnology memory, biological memory, or other data storage media. Indeed, computer-implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the systems described herein. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C sec. 112, sixth paragraph, other aspects may likewise be embodied as a means-plus-function claim, or in other forms, such as being embodied in a computer-readable medium. (Any claims intended to be treated under 35 U.S.C. §112, ¶6 will begin with the words "means for", but use of the term "for" in any other context is not intended to invoke treatment under 35 U.S.C. §112, ¶6.) Accordingly, the applicant reserves the right to pursue additional claims after filing this application to pursue such additional claim forms, in either this application or in a continuing application.

We claim:

1. A method for identifying characters in a handwritten input on a touch-sensitive device, the method comprising:
    establishing an anchor point on the touch-sensitive device;
    establishing distances from the anchor point to one or more reference support lines;
    receiving a handwritten user input via the touch-sensitive device;
    identifying a set of candidate characters based on the handwritten user input;
    estimating support lines for each of the candidate characters;
    associating temporary reference support lines for each candidate character based on: an angle of the estimated support lines for the candidate character and the established anchor point, and the established distances from the anchor point to the one or more reference support lines;
    for each candidate character,
        measuring a deviation between the estimated support lines and temporary reference support lines to determine a scale and position deviation from an expectation for each candidate character, and
        combining the measured deviation with candidate expectation deviation measurements for properties other than scale and position;
    ranking each candidate character based on a total deviation measurement for each candidate character; and,
    identifying a best-ranked candidate character based at least in part on a smallest total deviation measurement.

2. The method of claim 1, wherein the method further comprises establishing new reference support lines based on the temporary reference support lines associated with the best-ranked candidate character.

3. The method of claim 1,
    wherein the total deviation measurement for each candidate character is further based at least in part on a deviation between an estimated candidate writing angle and an angle of an orthogonal projection point of a mass center of the curve to a baseline of the estimated support lines around the anchor point.

4. The method of claim 1 further comprising:
    receiving a selection of one of the candidate characters from the user; and
    setting the new reference support lines as the candidate support lines for the selected candidate.

5. The method of claim 1 wherein:
    the reference support lines include a helpline and a baseline and the helpline and the baseline are parallel;
    the helpline is a first predetermined perpendicular distance from the anchor point; and
    the baseline is a second predetermined perpendicular distance from the anchor point.

6. The method of claim 5 wherein the touch-sensitive device has a circular shape and the anchor point is at a center of the touch-sensitive device.

7. The method of claim 5 wherein a distance between the helpline and the baseline is equal to an expected height of a character of the handwritten input.

8. The method of claim 6 further comprising displaying the helpline and the baseline on the touch-sensitive device.

9. The method of claim 1 wherein the handwritten user input comprises a single character.

10. A system for identifying characters in a handwritten input on an input device, the system comprising:
    at least one processor;
    at least one data storage device coupled to the at least one processor;
    at least one input device, coupled to the at least one processor, to receive a single-character manually input by a user;
    means for establishing an anchor point on the touch-sensitive device;
    means for establishing distances from the anchor point to one or more reference support lines;
    means for receiving a handwritten user input via the touch-sensitive device;
    means for identifying a set of candidate characters based on the handwritten user input;
    means for estimating support lines for each of the candidate characters;
    means for associating temporary reference support lines for each candidate character based on: an angle of the estimated support lines for the candidate character and the established anchor point, and the established distances from the anchor point to the one or more reference support lines;
    means, for each candidate character, for measuring a deviation between the estimated support lines and temporary reference support lines to determine a scale and position deviation from an expectation for each candidate character, and for combining the measured deviation with candidate expectation deviation measurements for properties other than scale and position;

means for ranking each candidate character based on a total deviation measurement for each candidate character; and, means for identifying a best-ranked candidate based at least in part on a smallest total deviation measurement.

11. The system of claim 10 wherein:
the reference support lines includes a helpline and a baseline and the helpline and the baseline are parallel;
the helpline is a first predetermined perpendicular distance from the anchor point; and
the baseline is a second predetermined perpendicular distance from the anchor point.

12. The system of claim 10, further comprising means for establishing new reference support lines based on the temporary reference support lines associated with the best-ranked candidate character, and
wherein the total deviation measurement for each candidate character is further based at least in part on a deviation between an estimated candidate writing angle and an angle of an orthogonal projection point of a mass center of the curve to the baseline of the estimated support lines around the anchor point.

13. A non-transitory computer-readable medium containing instructions that when executed by a computing device cause the computing device to perform a method for identifying characters in a handwritten input manually provided by a user to an input device, the method comprising:
establishing a point on the touch-sensitive device;
establishing distances from the point to reference support lines;
receiving a handwritten user input via the touch-sensitive device;
identifying a set of candidate characters based on the handwritten user input;
estimating support lines for each of the candidate characters;
for each candidate character, measuring a deviation between a distance between the support lines and the point and a distance between the reference support lines and the point;
for each candidate character, measuring a distance between a baseline of the support lines and a baseline of the reference support lines;
ranking the candidate characters based on a deviation measurement for each candidate character, wherein the deviation measurement is based at least in part on:
the measured deviation between the distance between the support lines and the point and the distance between the reference support lines and the point, and
the measured distance between the baseline of the support lines and the baseline of the reference support lines; and
identifying a best-ranked candidate based at least in part on a smallest total deviation measurement.

14. The computer-readable medium of claim 13, wherein the estimated support lines each include an estimated candidate writing angle, and wherein the method further comprises establishing new reference support lines based on the orthogonal distance of the reference support lines and the candidate writing angle associated with the best-ranked candidate character.

15. The computer-readable medium of claim 13 further comprising:

receiving a second handwritten user input via the touch-sensitive device;
identifying a set of candidate characters for the second handwritten user input based on the second handwritten user input;
estimating support lines for each of the candidate characters for the second handwritten user input;
for each candidate character for the second handwritten user input, measuring a deviation between a distance between the support lines and the point and a distance between the new reference support lines and the point;
for each candidate character for the second handwritten user input, measuring an distance between a baseline of the support lines and a baseline of the new reference support lines;
ranking the candidate characters for the second handwritten user input based on a second total measurement for each candidate character, wherein the second total measurement is based at least in part on:
the measured deviation between the distance between the support lines and the point and the distance between the new reference support lines and the point, and
the measured distance between the baseline of the support lines and the baseline of the new reference support lines; and
identifying a best-ranked second candidate character based at least in part on the smallest second total deviation measurement.

16. The computer-readable medium of claim 15,
wherein the handwritten user input includes a curve,
wherein the estimated support lines each include an estimated candidate writing angle, and
wherein the total deviation measurement for each candidate character is further based at least in part on a deviation between the estimated candidate writing angle and an angle of an orthogonal projection point of a mass center of the curve to the baseline of the temporary support lines around the point.

17. The computer-readable medium of claim 15 further comprising:
receiving a selection of one of the candidate characters from the user; and
setting the new reference support lines as the candidate support lines for the selected candidate.

18. The computer-readable medium of claim 15 wherein:
the reference support lines include a helpline and the baseline and the helpline and the baseline are parallel;
the helpline is a first predetermined perpendicular distance from the point; and
the baseline is a second predetermined perpendicular distance from the point.

19. A non-transitory computer-readable medium containing instructions that when executed by a computing device cause the computing device to perform a method for identifying characters in a handwritten input manually provided by a user to an input device, the method comprising:
establishing distances from a point to reference support lines;
receiving a first handwritten user input via the input device;
identifying candidate characters based on the first handwritten user input;
estimating a candidate writing angle for the candidate characters;

associating candidate support lines that have candidate writing angles estimated for candidate characters and established distances from the point to the reference support lines;

identifying at least one deviation between the reference support lines and the candidate support lines for the candidate characters;

identifying a preferred candidate character based at least in part on one or more deviations between the reference support lines and the candidate support lines; and establishing new reference support lines based on the candidate support lines associated with the preferred candidate character.

20. The computer-readable medium of claim 19 wherein:

the support lines includes a helpline and a baseline that are parallel;

the helpline is a first predetermined perpendicular distance from the point; and the baseline is a second predetermined perpendicular distance from the point, and wherein the handwritten user input comprises a single character associated with one of multiple, different languages.

* * * * *